Dec. 9, 1924.　　　　　　　　　　　　　　　　　　　　　　　1,518,280
M. M. STOCKTON
BANKING INSTRUMENT FOR USE IN UTILIZING SAVING DEPOSITS AS A CREDIT
WITHOUT WITHDRAWAL
Filed Sept. 1, 1923

| NUMBER_____ | ST. LOUIS,_____ 192__ |
|---|---|

BLANK NATIONAL BANK　$_____

ON _____ 192__ PAY TO _____

_____ DOLLARS

BLANK NATIONAL BANK

_____
CASHIER

- - - - - - - - - - - - - - - - - - - - - - - - - - - - - - - - - - - - - - - -

NUMBER_____　　　　　　　ST. LOUIS,_____ 192__

BLANK NATIONAL BANK

ON _____ 192__ CHARGE MY SPENDERS SAVINGS ACCOUNT $_____

_____DOLLARS

AND IN CONSIDERATION OF SERVICES RENDERED I AGREE TO DEPOSIT IN THE ABOVE NAMED BANK THE AMOUNT OF THIS CHARGE DIVIDED BY THE NUMBER OF WEEKS OR MONTHS ELAPSING BETWEEN DATE OF THIS INSTRUMENT AND ITS MATURITY NAMELY $_____ EACH WEEK/MONTH. I ALSO AGREE THAT SAID BANK SHALL HOLD SUFFICIENT FUNDS FROM MY BALANCE TO SATISFY ANY OUTSTANDING DEFERRED CHARGES SIGNED BY ME AGAINST THIS ACCOUNT.

SPENDERS SAVINGS
ACCOUNT NUMBER _____

The upper and lower part of this charge must be presented intact to the bank, and when the lower section is found to be properly signed and the charge approved the upper part is to be detached, signed by an officer of the bank and returned to the Merchant presenting same.

*Inventor:*
*MEREDITH M. STOCKTON*
By Bruce A. Elliott
*Attorney*

Patented Dec. 9, 1924.

1,518,280

UNITED STATES PATENT OFFICE.

MEREDITH M. STOCKTON, OF ST. LOUIS, MISSOURI.

BANKING INSTRUMENT FOR USE IN UTILIZING SAVING DEPOSITS AS A CREDIT WITHOUT WITHDRAWAL.

Application filed September 1, 1923. Serial No. 660,461.

*To all whom it may concern:*

Be it known that I, MEREDITH M. STOCKTON, a citizen of the United States, residing in the city of St. Louis and State of Missouri, have invented new and useful Improvements in Banking Instruments for Use in Utilizing Saving Deposits as a Credit without Withdrawal, of which the following is a specification.

This invention relates to banking, and particularly to the subject of savings accounts.

The general object of the invention is to provide a banking device by the use of which a person, having a savings account, may purchase goods on a cash basis without withdrawing the savings account, by agreeing to deposit the amount of the purchase, in time payments, in the bank, whereupon the bank issues to the merchant an obligation of the bank payable at the expiration of the time payment period, and which obligation the merchant may discount at the bank at a preferred rate, if he so desires. A merchant who does business only on a cash basis, or on monthly credits, is thus enabled to accommodate a customer who wishes to purchase goods on a time payment plan extending over a considerable period of time, without any risk of losing deferred payments, while the purchaser is afforded a means, by the bank, of buying goods on the time payment or installment plan by paying the money into the bank where it draws interest, and is not only discouraged from withdrawing the amount of his savings, either at one time or periodically, to meet payments on the purchase, but is encouraged, by the arrangement, to further saving. Thus, as the money of the depositor is not withdrawn, the bank can afford to continue to pay interest; while if the merchant desires to collect the amount of the purchase from the bank before the expiration of the time period allowed for a re-payment to the bank, he has to accept the customary discount which is part of the agreement made with the bank.

The net result of the transaction, effected according to my invention, is that the purchaser, desiring to purchase goods to the value of, say $100.00, and having at least this amount on deposit, by authorizing the bank to enter a deferred charge against his savings account for such amount, and agreeing to make weekly or monthly payment for a certain period, say, six months, to total this amount, can procure from the merchant the goods to the value of $100.00 as though he had paid in cash. The bank, having the amount of the purchase in hand, assumes the obligation of the purchaser and issues to the merchant an agreement to pay the amount of the purchase money at some date in the future, covering the period required for the depositor to complete payments to the bank to the amount of the purchase. The merchant, on his part, can hold the bank's obligation until the expiration of the time payment period, and then collect the full amount; or, under an agreement with the bank, he can discount the bank's obligation, at any time, at a preferred rate agreed upon. Thus $100.00 spent in this manner, instead of being a loss to deposits, as it would be under existing conditions, will show an average balance, for a six months' period, of over $158.00 per month at present rates of interest and discount.

Practically every saver has a more or less definite idea of spending the amount he has saved; and instead of combating this tendency, which is largely useless, my invention puts the bank in a position to take advantage of this condition to the mutual advantage of both the bank and the saver. The plan also affords the saver all the advantages and conveniences of time payments without any of the disadvantages of that method of purchase.

As one of the great conveniences to the merchant, it may be mentioned that this plan will do away with the necessity of recording and releasing chattel mortgages on goods purchased on the time payment plan, which is made necessary by the laws of most States before a merchant can replevin goods sold on the installment plan, and on which the purchaser has defaulted in payments.

The above recited objects of the invention and also the advantages accruing therefrom, are effected and secured by means of the novel device shown in the accompanying drawing and hereinafter claimed, and comprising two connected blank memoranda, one of which is signed by the purchaser and delivered to the merchant, and which device with its signed memorandum is then shown to the banker issuing the same, by the merchant, whereupon the second memorandum is signed by the banker, detached from the first memorandum and delivered to the merchant.

The drawing is a view of the banking device forming the subject of this invention. Referring to this device, the numeral 1 indicates a blank form of obligation to be filled in and signed by an officer of the issuing bank and having, in addition to the issuing bank's name, printed in bold type as usual on checks, or the like, spaces for the number of the account, the place and date of issuance, the amount involved, the date when the bank promises to pay such amount, the name of the payee, and for the name of an officer of the issuing bank placed under the name of said bank printed in the signature space. The numeral 2 indicates a blank form of obligation to be signed by the purchaser and having, in addition to the issuing bank's name in bold type, spaces thereon for filling in the number of the account, the date of issuance, the date on which the amount of the purchase is to be charged against the savings account followed by wording authorizing the bank to make such charge, a space for the amount of the purchase, and an agreement printed on the memorandum over a space for his signature, which obligates the purchaser to deposit in the bank the amount of the charge in weekly or monthly installments of a given amount over a period of time extending from the date of the obligation to such date in the future as will enable the obligation to be discharged. The length of time allowed the purchaser to complete his time payments will, of course, be the same as that for which the obligation of the bank, issued to the merchant, will run. Between the two memoranda, 1 and 2, I preferably provide either a line of perforation 3, or some other way of weakening the paper along this line, so that after the merchant has presented the signed obligation of the purchaser to the bank, and the bank has signed its obligation to the merchant, the two memoranda may be readily separated.

A bank using my invention would make suitable arrangements for utilizing the same with various merchants handling different lines of goods so that the savings depositors of the bank could be accommodated in making any character of purchase, and the merchants making such arrangement with the bank would reap the advantage of having such customers of the bank directed to them.

It will be readily seen, from the above outline of the method of practicing my invention, that the bank not only does not lose, but in the aggregate would gain in the amount of its savings deposits; that the customer does not lose the interest which he otherwise would lose by withdrawing his savings, and in reality, receives interest on money spent; that the merchant is absolutely secured in his payment; that the bank is also absolutely secured, having the amount of the purchase on hand, and an authority from the depositor to enter a deferred charge against it; and, finally, that the depositor has all of the advantages of a cash purchase with the privilege of making time payments but without any of the disadvantages applying to the installment plan.

I claim:

1. A banking device for enabling a savings account to be used without withdrawal in making purchases from a merchant on a cash basis, comprising two connected and separable memoranda, the one being a blank form containing indicia constituting an obligation by a bank to pay a certain amount of money at a future date, and the other being a blank form containing indicia constituting an authorization by a depositor of the bank having a savings account therein, authorizing the bank to make a charge against the savings account at a certain date in the future.

2. A banking device for enabling a savings account to be used without withdrawal in making purchases from a merchant on a cash basis, comprising two connected and separable memoranda, the one being a blank form containing indicia constituting an obligation by a bank to pay a certain amount of money at a future date, and the other being a blank form containing indicia constituting an authorization by a depositor of the bank having a savings account therein, authorizing the bank to make a charge against the savings account at a certain date in the future, and containing an agreement that the depositor will make weekly or monthly payments of a stipulated amount over a certain period of time, terminating at the date of maturity of the instrument.

3. A banking device for enabling a savings account to be used without withdrawal in making purchases from a merchant on a cash basis, comprising two connected and separable memoranda, the one being a blank form containing indicia constituting an obligation by a bank to pay a certain amount of money at a future date, and the other being a blank form containing indicia constituting an authorization by a depositor of the bank having a savings account therein, authorizing the bank to make a charge against the savings account at a certain date in the future, and containing an agreement that the depositor will make weekly or monthly payments of a stipulated amount over a certain period of time, terminating at the date of maturity of the instrument, each of said memoranda containing a suitably designated space for receiving the number of the savings account.

4. A banking device for enabling a savings account to be used without withdrawal in making purchases from a merchant on a cash basis, comprising two connected and separable memoranda weakened along a line of separation, the one memorandum being a blank form containing indicia constituting an obligation by a bank to pay a certain amount of money at a future date, and containing the name of the bank and a space suitably designated for the signature of an officer thereof, and the other memorandum being a blank form containing indicia constituting an authorization by a depositor of the bank having a savings account therein, authorizing the bank to make a charge against the savings account at a certain date in the future, and containing an agreement to deposit at regular intervals a stipulated amount, which payments will total the amount of the charge, and containing suitably designated spaces for the signature of the depositor and his savings account number.

5. A banking device for enabling a savings account to be used without withdrawal in making purchases from a merchant on a cash basis, comprising two connected and separable memoranda, the one being a blank form containing indicia constituting an obligation by a bank to pay a certain amount of money at a future date and containing suitably designated spaces for date, the number of the account, the date when the payment is to be made, and the amount of the payment, and containing the name of the bank in the signature space, with a suitably designated space for the signature of an officer of the bank thereunder, and the other memorandum being a blank form containing indicia constituting an authorization by a depositor of the bank having a savings account therein, authorizing the bank to make a charge against the savings account at a certain date in the future, and having suitably designated spaces for date, the number of the savings account, the date when the charge is to be made, the amount thereof, and for the depositor's signature, and containing also an agreement on the part of the depositor to make periodical payments into the bank of a stipulated amount to total the amount of the charge.

In testimony whereof, I have hereunto set my hand.

MEREDITH M. STOCKTON.